Oct. 31, 1944.  A. H. BENNETT ET AL  2,361,589
LENS
Filed Aug. 14, 1940  2 Sheets-Sheet 2
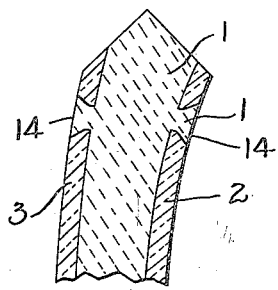
Fig. VII
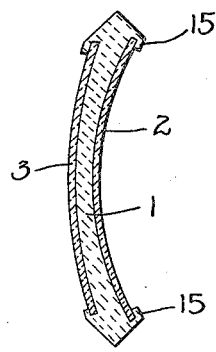
Fig. VIII
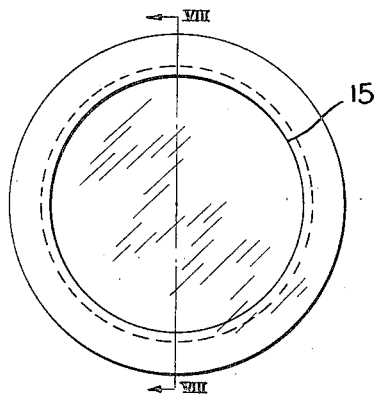
Fig. IX
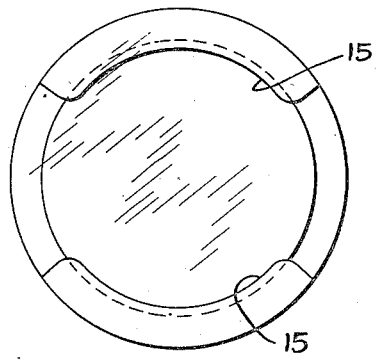
Fig. X
INVENTOR.
ALVA H. BENNETT
ROGER S. ESTEY
HARRY H. STYLL
BY
Harry H. Styll
ATTORNEY.

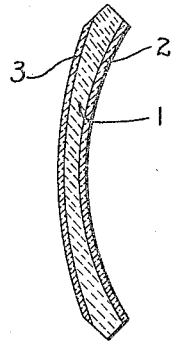
Fig. I
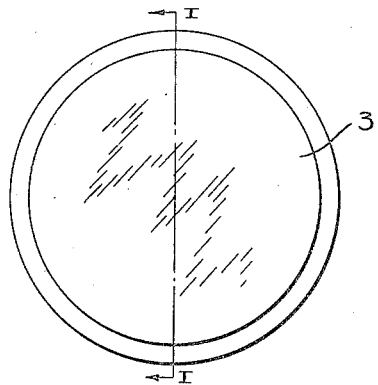
Fig. II
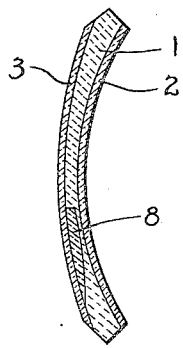
Fig. III
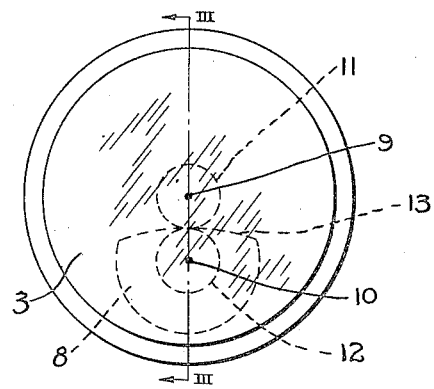
Fig. IV
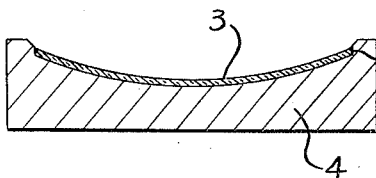
Fig. V
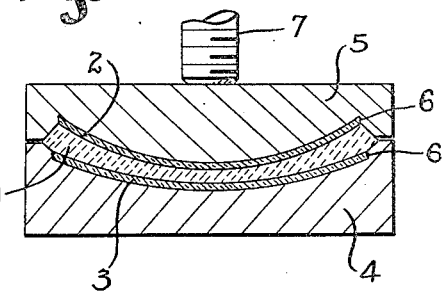
Fig. VI
INVENTOR.
ALVA H. BENNETT
ROGER S. ESTEY
HARRY H. STYLL
BY Harry H. Styll, ATTORNEY.

Patented Oct. 31, 1944

2,361,589

UNITED STATES PATENT OFFICE 2,361,589

LENS

Alva H. Bennett, Kenmore, and Roger S. Estey, Buffalo, N. Y., and Harry H. Styll, Southbridge, Mass., assignors to American Optical Company, Southbridge, Mass., a voluntary association of Massachusetts Application August 14, 1940, Serial No. 352,588

2 Claims. (Cl. 88—54)

This invention relates to improvements in ophthalmic lenses.

A principal object of the invention is the provision of improved ophthalmic lenses having a body portion of an organic plastic resin and lens surfaces of a covering or coating of a lens medium of a harder and more scratch resisting nature.

Another object of the invention is to provide an ophthalmic lens having a base or body portion of an organic plastic resin lens medium with the lens surfaces covered with a layer of a harder scratch resisting lens medium unitedly secured together.

Another object of the invention is the provision of means for molding or pressing the layers of a lens of this nature together to form a unitary structure.

Another object of the invention is to provide improved means for pressing or molding a lens having a plastic resin inner portion and outer layers of glass to make a unitary structure.

Another object of the invention is to provide a multifocal or bifocal lens having a plastic resin inner portion and outer surfaces of a higher melting point than the plastic resin and a minor lens of a lens material having a higher melting point than the plastic resin embedded in the plastic portion under an outer layer.

Another object of the invention is to provide a lens of organic plastic resin lens medium with means for holding lens layers on its faces of a harder and scratch resisting lens medium.

Another object of the invention is to provide simple and economic means for producing plastic resin lenses with outer surfaces having a higher scratch resistance than the plastic resin.

Other objects and advantages of the invention will become apparent from the following description taken in conjunction with the accompanying drawings. It will be apparent that many changes in the arrangement of parts and the details of construction can be made without departing from the invention as expressed in the accompanying claims. It is not, therefore, desired to limit the invention to the exact matters shown and described as the preferred forms have been set forth by way of illustration only.

Referring to the drawings:

Fig. I is a cross section on line I—I of Fig. II;

Fig. II is a front view of a lens of the invention;

Fig. III is a cross section on line III—III of Fig. IV;

Fig. IV is a front view of a multifocal or bifocal lens of the invention;

Fig. V is a cross section through a lower mold or die for molding or pressing a lens of the invention;

Fig. VI is a cross section through a mold or press for molding or pressing a lens of the invention;

Fig. VII is a sectional enlarged cross section of a lens of one form of the invention;

Fig. VIII is a cross section on line VIII—VIII of Fig. IX;

Fig. IX is a front view of a lens of another form of the invention; and

Fig. X is a front view of yet another form of lens of the invention.

Referring to the drawings wherein similar reference characters denote corresponding parts throughout:

In the lens of Figs. I and II the inner lens portion 1 is made from an organic transparent plastic resin, superimposed on the inner portion 1 are the surface portions 2 and 3, of a glass lens medium or other lens medium of higher scratching resistance than the plastic layer 1.

This lens may be produced as shown in Figs. V and VI, wherein 4 is a lower mold or die and 5 is an upper mold or die. The dies 4 and 5 are preferably recessed at 6 to receive and hold the outer layers 2 and 3. In setting up the mold or die the lower layer 3 is placed in the recess 6 of the lower die 4, the plastic layer 1 is placed over the layer 3, the upper layer 2 is placed in the recess 6 of the mold or die 5, and then the die or mold 5 is pressed downward on the assembled lens parts to press them to shape and to form a unitary structure. The die or mold part 5 may be operated by power as through the screw connection 7. The assembled parts may be heated in the die or mold during the pressing operation or the plastic layer 1 may be preheated to make it plastic. Preferably the layers 2 and 3 have been preshaped to fit the recesses 6, and the plastic 1 is then heated to make it plastic and the mold pressure applied to shape the assembled lens parts to desired shape and to form a unitary structure.

The layers 2 and 3 will adhere to the plastic layer 1 because of molecular adhesion due to the intimate contact of the contacting surfaces which have been formed under heat and pressure as is usual with contacting surfaces having identical and intimate contact throughout the surface area. The plastic may also adhere to the outer layers where certain materials are used for the outer layers 7 such as other plastics having higher melting points.

To insure a bond between the plastic and outer layers a thin layer of vinyl acetal may be placed between the plastic and outer layers. When pressed together under heat and pressure this will insure a strong bond as has been demonstrated from experience.

In Figs. III and IV is shown a bifocal or multifocal lens having a minor portion 8 of glass or a lens material having a higher melting point than the plastic layer 1, and a higher scratch resistance. This minor lens 8 may be inserted by pressing it into the plastic 1 before the layer 3 is placed over it. Thereafter the procedure will be the same as in the case of Figs. I and II, etc.

The advantage in making a bifocal of this character is that any desired centering of the minor portion with relation to the major portion may be made, a process that is impossible in many shapes of minor portions which have to be inserted in ground recesses as in the case of all glass lenses.

In Fig. IV the optical center of the major portion is at 9, that of the minor portion is at 10. The dotted circles 11 and 12 indicate the diameter of the pupil of the eye. It will be noted in Fig. IV, the top edge 13 of the minor portion 8 is midway between the optical centers 9 and 10. With this relationship of the minor portion to the major portion it will be seen that the eye will be directly over an optical center when the eye has just cleared the top edge 13 of the minor portion, which is the ideal arrangement for vision as the eye would be confused if over the top edge 13. Here the eye falls over the respective optical centers, the best portion of the lens, just as soon as it clears the top edge of the minor portion.

It is clear that under this process any shape of minor portion may be used, and any desired lens surfaces on the faces of the minor portion may be used, a situation not possible in all glass lenses.

Plastic resin has been found to be a very desirable lens medium in all characteristics except that it is so soft it will scratch easily. It is lighter in weight than glass, has a better light transmission and is non-breakable, all very desirable characteristics in lenses. With this invention this desirable plastic medium may be used for the advantages thereof, and the scratching prevented by the harder outer layers.

In the form shown in Fig. VII the outer layers 2 and 3 are provided with recesses 14, preferably tapered of desired number and location. When pressure and heat are applied to press the layers together a portion of the plastic will be forced into the recesses 14 providing a lock between the outer layers and the plastic layer.

In Figs. VIII and IX the plastic layer 1 is provided with a flange 15 extending over the edges of the layers 2 and 3 to hold them in place over the plastic layer 1. In this form the layers may be pressed together in the molds or dies and the flange 15 formed as a part of the assembling operation.

Also the plastic layer 1 may be formed with the flanges 15 in the pressing operation, and the layers 2 and 3 snapped in thereafter due to the springiness of the plastic material.

Fig. X shows a form of the invention in which the flange 15 extends only partially around the edge of the lens. These partial flanges may be of desired number and spacing. The partial flanges facilitate the snapping in of the outer layers 1 and 2.

From the foregoing it will be seen that I have provided simple and inexpensive means for obtaining all the objects and advantages of the invention in an economic way.

Having described the invention, we claim:

1. A lens comprising as its main lens portion a body of transparent plastic resinous material having relatively thin layers of glass of substantially uniform thickness secured to the opposed sides therof and of a hardness greater than the hardness of the resinous material with the thickness of said respective glass layers being considerably less than the thickness of the resinous material and with the outer surfaces of said glass layers being formed to optical curvatures which when combined with the resinous material will introduce substantially the optical power desired of the lens, said main body portion of the lens and said opposed outer glass layers having mechanically interlocked portions for aiding in retaining the parts in assembled relation.

2. A lens comprising as its main lens portion a body of transparent plastic resinous material, said plastic resinous body having a segment of material of a different index of refraction than said resinous material embedded therein and having surface curvatures introducing optical characteristics different than the remainder of the lens, said resinous body having relatively thin layers of glass of substantially uniform thickness secured to the opposed sides thereof and exteriorly of said segment, said thin layers being of a hardness greater than the hardness of the resinous material with the thickness of said respective glass layers being considerably less than the thickness of the resinous material and with the outer surfaces of said glass layers being formed to optical curvatures which when combined with the resinous material will introduce substantially the optical power desired of the lens, said main body portion of the lens and said opposed outer glass layers having mechanically interlocked portions for aiding in retaining the parts in assembled relation.

ALVA H. BENNETT.
ROGER S. ESTEY.
HARRY H. STYLL.